United States Patent

[11] 3,607,934

| [72] | Inventors | Otto Bretschneider<br>Bonn-Venusbert;<br>Heinz Harnisch, Weiden-Lovenich; Werner Klose, Knapsack near Cologne, all of Germany |
|---|---|---|
| [21] | Appl. No. | 666,494 |
| [22] | Filed | Sept. 8, 1967 |
| [45] | Patented | Sept. 21, 1971 |
| [73] | Assignee | Knapsack Aktiengesellschaft<br>Knapsack, near Cologne, Germany |
| [32] | Priority | Sept. 17, 1966 |
| [33] | | Germany |
| [31] | | K 60275 IVb/12 0 |

[54] PROCESS FOR THE MANUFACTURE OF CHLOROPHOSPHINES
14 Claims, No Drawings

[52] U.S. Cl. .................................................. 260/543 P
[51] Int. Cl. ...................................................... C07f 9/34
[50] Field of Search .......................................... 260/543 P

[56] References Cited
UNITED STATES PATENTS 3,057,917  10/1962  Maier ........................... 260/543

Primary Examiner—Charles B. Parker
Assistant Examiner—Edward Jay Gleiman
Attorney—Connoly and Hutz ABSTRACT: Hydrocarbon-substituted chlorophosphines of the general formula $R_nP(Cl)_{3-n}$, in which R stands for a hydrocarbon radical having 1 to 3 carbon atoms and $n$ stands for 1 or 2 are produced by reaction of phosphorus in vapor or gas form with a hydrocarbon chloride in gas or vapor form in the presence of active carbon as the catalyst.

PROCESS FOR THE MANUFACTURE OF CHLOROPHOSPHINES

The present invention relates to a process for the manufacture of hydrocarbon-substituted chlorophosphines of the general formula: $R_nP(Cl)_{3-n}$, in which R stands for a hydrocarbon radical having 1 to 3 carbon atoms and $n$ stands for 1 or 2, by reaction of phosphorus with a hydrocarbon chloride in gas or vapor form of the general formula RCl, in the presence of a catalyst.

It is known that halogenated phosphines can be produced by reaction of organic substances with phosphorus compounds. The disadvantage associated with these processes resides in the formation of phosphorus intermediate compounds and therefore in the plurality of steps needed to produce the phosphines.

In accordance with German Pat. No. 1,122,522 it is also known that halogenated phosphines can be produced directly by reaction of phosphorus with hydrocarbon halides. In this process red phosphorus is mixed with a metal catalyst, particularly copper, and the resulting mixture is applied to a carrier, e.g. glass or asbestos wool. The catalyst so made is heated for about 1 hour in a stream of nitrogen to a temperature higher than 300° C., and hydrocarbon halide is thereafter passed over it.

Of the disadvantages inter alia associated with this process there are mentioned the necessary intermittent operation, the relatively small yields, and the use of a rather difficulty accessible and costly catalyst.

It has now unexpectedly been found that the disadvantages mentioned above can be obviated in the production of chlorophosphines through the use of phosphorus in gas or vapor form and through the use of active carbon as the catalyst.

A carrier gas mixed with the phosphorus, should conveniently be used as the phosphorus transport agent.

The hydrocarbon chloride in gas form, which is one of the reaction components, an inert gas, e.g. hydrogen or nitrogen, or hydrogen chloride can serve as the carrier gas, which can be used alone or in combination.

The phosphorus in gas or vapor form is preferably mixed with the hydrocarbon chloride in gas or vapor form, inside a reaction zone packed with active carbon and preferably brought to reaction temperature in an attempt to obviate premature decomposition of the hydrocarbon chloride.

The reaction temperature should lie between 300° and 400° C., preferably however it should be about 350° C.

The useful hydrocarbon chlorides include methyl, ethyl and propyl chloride.

Good yields are obtained especially when the ratio of partial pressure of phosphorus in vapor form to partial pressure of hydrocarbon chloride is higher than 0.2, preferably between 0.3 and 1.4.

The reaction should be carried out inside a graphite-lined shaft furnace supplied continuously with a charge formed of active carbon on the one hand and of further reaction components on the other, travelling therethrough equidirectionally or crosscurrently with respect to each other.

Once the reactants have been brought to reaction temperature and reacted with one another, the resulting reaction products as well as the inactivated active carbon-catalyst are continuously removed from the furnace.

The following examples illustrate the process of the present invention.

The examples were carried out using a Pyrex glass tube 1 m. long and 25 mm. wide. The glass tube subdivided in two sections, was electrically heated from the outside to the temperatures desired to prevail in the two sections. The tube front section which contained dry red phosphorus placed in a graphite vessel, was outside-heated to 500° C. to ensure rapid vaporization of the phosphorus. In the second tube section provided with a displacement glass body joining the graphite vessel in the tube front section, the temperature of the phosphorus in vapor form was reduced down to that desired for the catalyst. A chloroalkyl supply pipe disposed to end very close to that inserted displacement body, ensured that the chloroalkyl contacted the $P_4$-vapor not earlier than in the immediate neighborhood of the catalyst. A carrier gas served to convey the $P_4$-vapors from the graphite vessel to the catalyst, and the issuing vapors were passed through a gas trap cooled down to a temperature of $-80°$ C., in which the volatile chlorophosphines were subjected to fractional distillation to be freed from excessive condensed phosphorus.

EXAMPLE 1: (without catalyst)

27 liters $CH_3Cl$ in admixture with 43 grams $P_4$-vapor were passed for 90 minutes through the second section of the Pyrex glass tube heated to 350° C. and packed with glass Raschig rings (3 mm. wide). No chloromethyl phosphine could be found to have been formed.

EXAMPLE 2: (with active carbon as the catalyst in the presence of $H_2$)

35 liters $CH_3Cl$ were mixed within 2 hours with a mixture comprised of 52 grams $P_4$-vapor and 8 liters $H_2$, at the catalyst, and the resulting mixture was passed through the catalyst, at 350° C. The catalyst which was comprised of 36 grams dry active carbon and had been saturated earlier with $P_4$-vapor, at 350° C., was placed in the second section of the Pyrex glass tube. The issuing gases and vapors were cooled down to $-80°$ C. with condensation of all of the excessive $P_4$-vapor, the chloromethyl phosphine produced, and unreacted $CH_3Cl$. HCl escaped and was collected downstream that cooled trap in sodium hydroxide solution. $CH_3Cl$ and chloromethylphosphine were expelled successively by fractional distillation. 28.5 grams chloromethyl phosphine mixture were obtained. The red phosphorus in the graphite vessel was replaced and the experiment was repeated using the same catalyst and the same proportions of reaction components. 36.5 grams chloromethyl phosphine mixture were obtained. 33.5 grams chloromethyl phosphine mixture were obtained upon the second repetition, while only 7 grams chloromethyl phosphine mixture were obtained upon the third repetition. The catalyst had become inactive. 140 liters $CH_3Cl$ produced a total of 105.5 grams chloromethyl phosphine mixture $(CH_3)_2PCl + CH_3PCl_2$ with 36 grams catalyst, for a 68% $CH_3Cl$-conversion rate.

EXAMPLE 3: (with active carbon as the catalyst in the presence of HCl)

26 liters $CH_3Cl$ were mixed within 1.5 hours with a mixture comprised of 41 grams phosphorus and 20 liters HCl, at the catalyst, and the resulting mixture was passed through the catalyst at 350° C. The catalyst was comprised of 38 grams fresh, dried active carbon saturated earlier with $P_4$-vapor, at 350° C. The example was carried out using the same apparatus and the same conditions as those employed in example 2. Chloromethyl phosphine mixture was obtained at the following rates: 24 grams in the first experiment; 37 grams upon the first repetition; 39.5 grams upon the second repetition; 44 grams upon the third repetition; 40.5 grams upon the fourth repetition; 35 grams upon the fifth repetition; 20.0 grams upon the sixth repetition. The decreasing yields indicated the decreasing catalyst activity. 182 liters $CH_3Cl$ produced a total of 240 grams chloromethyl phosphine mixture $(CH_3)_2PCl + CH_3PCl_2$ with 38 grams catalyst, for a 68% $CH_3Cl$-conversion rate.

The fact that example 3 produced yields higher than those obtained in example 2 was due to the presence of HCl which enabled the thermal decomposition of the chloromethyl phosphines to be suppressed.

We claim:

1. In the process for the manufacture of hydrocarbon-substituted chlorophosphines of the general formula: $R_nP(Cl)_{3-n}$, in which R stands for an alkane radical having 1 to 3 carbon atoms and $n$ stands for 1 or 2, by the catalytic reaction in the vapor phase of $P_4$ with a hydrocarbon chloride of the general formula RCl, in which R represents a hydrocarbon radical having 1 to 3 carbon atoms, the improvement which comprises using active carbon as the said catalyst.

2. The process of claim 1, wherein the $P_4$ in vapor form is used in admixture with a carrier gas.

3. The process of claim 2, wherein the carrier gas is a member selected from the group consisting of an inert gas or hydrogen chloride.

4. The process of claim 3, wherein the said inert gas is hydrogen or nitrogen.

5. The process of claim 1, wherein the hydrocarbon chloride is mixed with the $P_4$ inside a reaction zone packed with active carbon.

6. The process of claim 5, wherein the reaction zone is heated to reaction temperature.

7. The process of claim 1, wherein the reaction is carried out at temperatures between 300° and 400° C.

8. The process of claim 7, wherein the reaction is carried out at a temperature of about 350° C.

9. The process of claim 1, wherein the ratio of partial pressure of the $P_4$ in vapor form to partial pressure of hydrocarbon chloride is higher than 0.2.

10. The process of claim 9, wherein the ratio of partial pressure of the $P_4$ in vapor form to partial pressure of hydrocarbon chloride is within the range of 0.3 to 1.4.

11. The process of claim 1, wherein a shaft furnace, supplied continuously with active carbon and with the further feed components, is heated to reaction temperature, and the resulting reaction products and the inactivated active carbon catalyst are continuously removed from the furnace.

12. The process of claim 11, wherein the shaft furnace is graphite lined.

13. The process of claim 11, wherein the active carbon and the feed components are supplied to the furnace to travel therethrough equidirectionally with respect to each other.

14. The process of claim 11, wherein the active carbon and the feed components are supplied to the furnace to travel therethrough crosscurrently with respect to each other.